(12) United States Patent
Le Gallo (10) Patent No.: US 9,080,243 B2
(45) Date of Patent: Jul. 14, 2015

(54) HIGH-TEMPERATURE ELECTROLYSER (HTE) WITH IMPROVED OPERATING SAFETY

(75) Inventor: Patrick Le Gallo, Saint Appolinard (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 90 days.

(21) Appl. No.: 13/820,904

(22) PCT Filed: Aug. 31, 2011

(86) PCT No.: PCT/EP2011/065003
§ 371 (c)(1),
(2), (4) Date: Mar. 5, 2013

(87) PCT Pub. No.: WO2012/031958
PCT Pub. Date: Mar. 15, 2012

(65) Prior Publication Data
US 2013/0168238 A1 Jul. 4, 2013

(30) Foreign Application Priority Data
Sep. 6, 2010 (FR) ...................................... 10 57054

(51) Int. Cl.
*C25B 9/04* (2006.01)
*C25B 9/08* (2006.01)
*C25B 9/18* (2006.01)
*C25B 1/12* (2006.01)
*C25B 1/04* (2006.01)
*C25B 1/06* (2006.01)
*C25B 9/00* (2006.01)

(52) U.S. Cl.
CPC ... *C25B 9/18* (2013.01); *C25B 1/06* (2013.01); *C25B 9/00* (2013.01); *Y02E 60/366* (2013.01)

(58) Field of Classification Search
CPC .............. C25B 1/12; C25B 9/08; C25B 1/04; C25B 9/04; C25B 9/18
USPC ......... 204/242, 258, 266, 267, 269, 270, 272, 204/275.1, 278
See application file for complete search history.

(56) References Cited

U.S. PATENT DOCUMENTS 8,317,986 B2   11/2012 Le Gallo
2008/0254333 A1   10/2008 Yoshino et al.

(Continued)

FOREIGN PATENT DOCUMENTS

| CN | 101809205 A | 8/2010 |
| FR | 2 921 389 A1 | 3/2009 |
| FR | 2 957 361 A1 | 9/2011 |

OTHER PUBLICATIONS

Preliminary Search Report issued Feb. 3, 2011 in French Patent Application No. 1057054 with English translation of categories of cited documents.

(Continued)

*Primary Examiner* — Zulmariam Mendez
(74) *Attorney, Agent, or Firm* — Oblon, McClelland, Maier & Neustadt, L.L.P.

(57) ABSTRACT

A high-temperature electrolyser including a stack of electrolysis cells in which steam is made to flow both at a cathode and at an anode. The architecture of the electrolyzer is configured to have each cathode inlet end and anode inlet end close to an oxygen, or respectably hydrogen, collection duct portion. With the structure, a buffer volume of steam is created around the oxygen and hydrogen collectors, which therefore constitutes a simple and effective sealing mechanism within the electrolyser.

9 Claims, 6 Drawing Sheets

(56) References Cited

U.S. PATENT DOCUMENTS

| | | |
|---|---|---|
| 2010/0200396 A1 | 8/2010 | Le Gallo |
| 2012/0325654 A1 | 12/2012 | Le Gallo et al. |
| 2013/0032490 A1 | 2/2013 | Le Gallo et al. |
| 2013/0244136 A1 | 9/2013 | Fleury et al. |

OTHER PUBLICATIONS

International Search Report issued Oct. 12, 2011 in PCT/EP2011/065003.

Office Action issued Dec. 29, 2014 in Chinese Patent Application No. 201180048599.0.

HIGH-TEMPERATURE ELECTROLYSER (HTE) WITH IMPROVED OPERATING SAFETY

TECHNICAL FIELD

The present invention relates to a method of high-temperature electrolysis of water for the purpose of producing hydrogen.

It also relates to a reactor for implementation of the method and a module with an associated sealed enclosure.

It relates more specifically to improved operating safety of high-temperature electrolysers, by reducing the risks of leaks which may cause impairments of efficiency and/or possible breakages of all or part of its elements.

PRIOR ART

A high-temperature electrolyser (HTE) includes multiple elementary cells formed by a cathode and an anode separated by an electrolyte, where the elementary cells are electrically connected in series by means of interconnecting plates which are generally interposed between an anode of an elementary cell and a cathode of the next elementary cell. An anode-anode connection followed by a cathode-cathode connection is also possible. The interconnecting plates are electronic conducting components formed by at least one metal plate. These plates also provide the separation between the cathodic fluid flowing in one elementary cell from the anodic fluid flowing in a following elementary cell.

The anode and the cathode are made of a porous material through which the gases can flow.

In the case of high-temperature electrolysis of water to produce hydrogen, steam flows in the cathode where the hydrogen is generated in gaseous form, and a draining gas can flow in the anode, and by this means collect the oxygen generated in gaseous form in the anode. Most high-temperature electrolysers (HTE) use air as the draining gas in the anode.

In high-temperature electrolysers the seals are conventionally made by "pasty" glass seals since they have, essentially, two advantages: good electronic insulation and good sealing without requiring mechanical clamping. The major disadvantages of these pasty glass seals are, conversely:

- fragility under its vitrous transition temperature, and possibility of breakage if it is subject to stress, notably due to differential expansion,
- difficulty of filling the thickness of a cathode-support cell (very thick porous material), ensuring sealing and its maintenance over time between two anodic and cathodic compartments; indeed, this type of cell does not enable a dense, resistant area, which can be used as the support, to be obtained in order to produce the seal. In addition, the glass or other fillers do not penetrate the pores of the porous material,
- need to machine the groove to receive the glass, due to the fact that many types of glass are obtained in situ from slips,
- a "ceiling" or vertical design of the HTE electrolyser is impossible due to the fact that a glass seal in its groove is likely to flow,
- due to the fact that a ceiling design of the HTE electrolyser is impossible, differentiated compression with a greater compression of the cells at the base of the stack, due to the weight of the latter, limiting the number of stacked cells,
- need for a temperature excursion beyond the operating temperature to manufacture the seal; this excursion is harmful for the metal materials, and therefore implies greater damage,
- difficulty in maintaining a seal subject to a high pressure differential (>100 mbar), due to the fact that glass which is viscous at the operating temperatures creeps,
- difficulty in maintaining a low leakage rate if there are operating temperature variations (thermomechanical breakage of the glass film), and more particularly after a given period of stoppage of hydrogen production, and resumed operation of the electrolysis,
- potential chemical incompatibility with the other components of the cell and of the interconnector(s), for example emission of $SiO_2$ vapours, which are polluting for the electrodes, the consequence being substantial corrosion of the gasket surfaces,
- creation of a rigid connection between the components of the stack through loss of viscosity of the glass during cooling, causing stresses during thermal transients,
- difficulty of disassembling components, or even impossibility of so doing without changing the cell or stack of cells.

Other solutions consist in brazing the metal of the interconnector on the ceramic. However, achieving wetting of the metal of the interconnector on the ceramic, together with the thermal expansion differences between these two materials, make this operation very difficult for large dimensions. Indeed, cooling after solidification of the soldering seam regularly causes breakage of the ceramic.

Lastly, other mica-based, or simply metal, compressive seals have been proposed: they require a substantial volume and very substantial external clamping, and are difficult to control and to maintain at temperature in order to obtain effective sealing without breakage of the cell in the course of heating. Indeed, at operating temperatures the very substantial clamping implies creep, and therefore modifications of the electrolyser structure, and therefore at best a loss of sealing.

In order to improve the operating safety of an HTE electrolyser the inventor proposed, in patent application FR 10 51783, filed in the applicant's name, causing steam containing at most 1% of H2 to flow both in the cathode and in the anode as a draining gas.

The inventor concluded from this that such flow of non-hydrogenated, or almost non-hydrogenated, steam enables sophisticated sealing solutions to be avoided, in particular in a feed-through of an interconnector beneath the anode by a duct for recovering the produced hydrogen. Indeed, if a leak does indeed occur here, the non-hydrogenated steam becomes sandwiched, forming, so to speak, a water cushion or in other words a gas buffer.

The aim of the invention is then to propose an optimisation of this buffer area created by causing steam to flow both in the cathode and in the anode as a draining gas, in an HTE electrolyser.

DESCRIPTION OF THE INVENTION

To accomplish this, one object of the invention is a reactor for high-temperature electrolysis of water, including a stack of elementary electrolysis cells, each formed of a cathode, an anode and an electrolyte sandwiched between the cathode and the anode, where at least one interconnecting plate is positioned between two adjacent elementary cells, in electrical contact with an electrode of one of the two elementary cells and an electrode of the other of the two elementary cells, where the interconnecting plate delimits at least one cathodic compartment and at least one anodic compartment for gas to flow respectively in the cathode and in the anode, in which one of the ends of the cathodic compartments, called the cathode inlet end, is connected to a feed able to deliver steam, and one of the ends of the anodic compartments, called the anode inlet end, is also connected to a feed able to deliver steam, in which the other of the ends of the cathodic compartments, called the cathode outlet end, emerges in the portion of the hydrogen collection duct which is made through the stack of cells and of the interconnecting plates, and the other of the ends of the anodic compartments, called the anode outlet end, emerges in the oxygen collection duct portion which is made through the stack of cells and of the interconnecting plates.

According to the invention, each cathode inlet end is positioned close to the oxygen collection and/or hydrogen collection duct portion, and each anode inlet end is positioned close to the hydrogen collection and/or oxygen collection duct portion.

It is here stipulated that the concept of "end" must be understood in the broad sense of fluids, and not in the strict geometric sense. An inlet end may thus be defined as being a fluid area from which the electrolysis reaction occurs with steam (cathode inlet end), or a fluid area from which the oxygen produced is evacuated by steam (anode inlet end). Similarly, an outlet end may be defined as being a fluid area from which the electrolysis reaction no longer occurs (cathode outlet end), or a fluid area from which the oxygen is no longer produced (anode outlet end). It is self-evident that positioning the inlet ends at the corners of an electrolyser constitutes a special case and comes within this definition.

Finally, the expression "close to" must be understood to mean, in the context of the invention, that the inlet end of a cathodic or anodic compartment is positioned at a distance from the periphery of the portion of the duct collecting respectively oxygen or hydrogen, such that the steam creates a buffer volume with the flow rate almost that of the feed of the HTE electrolyser, and before or at the start of the reduction reaction to which it is subject.

The invention thus consists in using the steam which has not yet been reduced, i.e. the steam which contains none or very little of the oxygen and hydrogen produced by the electrolysis, to create a buffer volume around the portions of the electrolyser through which the produced oxygen and hydrogen are collected and flow. The steam which has not yet been reduced is thus used judiciously as close as possible to its point of injection into the cathodic or anodic compartments, as a separation buffer between the hydrogen and the oxygen produced by electrolysis.

In other words, the inventor therefore considered that an optimisation of an HTE electrolyser and of its efficiency consisted, additionally, in creating a buffer area, as mentioned in application FR 10 51783 cited above, of bringing the inlet of a compartment (cathodic or anodic) as close as possible to the outlet of the same compartment and/or of another opposite compartment.

Indeed, in a water electrolysis reaction the steam introduced at the cathode is able to be transformed immediately into hydrogen and therefore, when it is used to make the seal of the oxygen outlet (collection of the produced oxygen), it is advantageous to do so as close as possible to its point of introduction.

And this solution according to the invention was by no means obvious, since the solution to make a seal between two gas areas which is generally accepted in the state of the art consists in separating two areas from one another.

It is self-evident that the skilled man in the art is careful to establish and maintain a sufficient stream of steam in order constantly to renew the steam present in the buffer areas according to the invention, and in order that this steam remains pure, i.e. not yet filled with reaction gases (produced O2 or H2).

With regard to the steam to be envisaged in the context of the invention, it can be of identical composition at the inlet of the cathode and of the anode, and then contain at most 1% hydrogen, as described and claimed in application FR 10 51783 cited above. It is also possible to envisage a steam at the cathode inlet which is different to the steam at the anode inlet: it is then possible to have a steam containing 5% or 10% H2 at the cathode's inlet, and a steam containing at most 1% H2 at the anode's inlet. Whatever the case, care is taken that the flow of steam flowing from a buffer area to a collection duct remains small.

According to a first embodiment, the reactor includes at least one duct where the steam can flow, where the duct is formed in the interconnecting plate, where a first end of the said duct is connected to the feed able to deliver steam and a second end conveys the steam, emerging in an area close to each cathode or anode inlet end, and to one and/or the other of the oxygen and hydrogen collection duct portions made through the stack of cells and the interconnecting plates, and where the area is designed to create a buffer volume of the said steam around the periphery of one and/or other of the oxygen and hydrogen collection duct portions before it arrives in the cathode or anode inlet end.

According to this embodiment, at least one rib may advantageously be positioned around the periphery of one or other of the oxygen and hydrogen collection duct portions, where the rib(s) is/are able to allow the guidance by pushing back the steam at the outlet of the second end of the duct towards the cathode or anode inlet end. The rib may in fact be a metal seal of simple design which, even if it has poor instrinsic performance, enables the flow of steam within the collection duct portion to be reduced substantially.

Also according to this embodiment, there are advantageously multiple additional ribs, positioned opposite the rib around the periphery of one or other of the oxygen and hydrogen collection duct portions, where the space between two adjacent additional ribs delimits a cathode or anode inlet end enables the speed of the pushed back steam to be increased.

According to another embodiment, the choice may also be made to have each cathode and/or cathode inlet end positioned at the periphery of the reactor in order to receive steam around the reactor, and close to one and/or other of the oxygen and hydrogen collection duct portions made through the stack of cells and interconnecting plates, where the area defined between the cathode or anode inlet end and of one and/or the other of the oxygen and hydrogen collection duct portions is designed to create a buffer volume of the said steam around the periphery or one or other of the oxygen and hydrogen collection duct portions.

According to this embodiment, at least one rib may be positioned around the periphery of one and/or the other of the oxygen and hydrogen collection duct portions, where the rib(s) is/are able to allow the steam to be guided peripherally around the said collection duct portion.

The rib may in fact be a metal seal of simple design which, even if it has poor intrinsic performance, enables the flow of steam within the collection duct portion to be reduced substantially.

The reactor for high-temperature electrolysis of water according to the invention is intended to operate at temperatures of over 450° C., typically between 700° C. and 1000° C.

BRIEF DESCRIPTION OF THE ILLUSTRATIONS

Other advantages and characteristics will be seen more clearly on reading the detailed description made with reference to the following figures, among which.

DETAILED ACCOUNT OF PARTICULAR EMBODIMENTS

The invention is described in relation to a type of architecture of high-temperature water electrolyser to generate hydrogen. It is self-evident that the invention may apply to other architectures. The high temperatures at which the represented electrolyser operates are higher than 450° C., typically between 700° C. and 1000° C.

It is stipulated that the terms "upstream" and "downstream" are used with reference to the direction of flow of the steam and of the hydrogen produced at the cathode.

It is stipulated that the representations of the different elements are not to scale.

Figure 1:
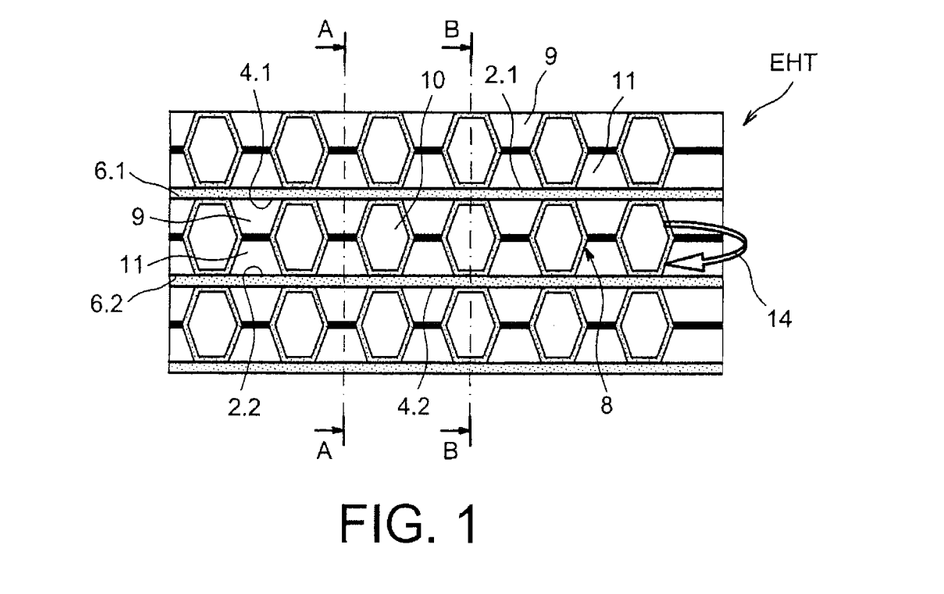
FIG. 1 is a side view of an embodiment of a reactor for high-temperature electrolysis according to the present invention.

In FIG. 1 an EHT electrolyser according to the present invention has been represented, including multiple stacked elementary cells C1, C2, etc.

Each elementary cell includes an electrolyte positioned between a cathode and an anode.

In the remainder of the description we shall describe cells C1 and C2 and their interface in detail.

Cell C1 includes a cathode 2.1 and an anode 4.1 between which is positioned an electrolyte 6.1, for example a solid electrolyte, generally 100 µm thick in the case of cells called "electrolyte support" cells and several µm thick in the case of cells called "cathode support" cells.

Cell C2 includes a cathode 2.2 and an anode 4.2 between which an electrolyte 6.2 is positioned.

Cathodes 2.1, 2.2 and anodes 4.1, 4.2 are made of a porous material and are, for example, 40 µm thick in the case of "electrolyte support" cells and of the order of 500 µm and 40 µm thick respectively in the case of "cathode support" cells.

Anode 4.1 of cell C1 is connected electrically to cathode 2.2 of cell C2 by an interconnecting plate 8 which comes into contact with anode 4.1 and cathode 2.2. In addition, it allows anode 4.1 and cathode 2.2 to be powered electrically.

An interconnecting plate 8 is interposed between two elementary cells C1, C2.

In the represented example it is interposed between an anode of an elementary cell and the cathode of the adjacent cell. But it could be interposed between two anodes or two cathodes.

Interconnecting plate 8 defines, with the adjacent anode and adjacent cathode, channels through which fluids flow. More specifically, they define anodic compartments 9 dedicated to the flow of the gases in anode 4 and cathodic compartments 11 dedicated to the flow of the gases in cathode 2.

In the represented example an anodic compartment 9 is separated from a cathodic compartment 11 by a wall 9.11. In the represented example, interconnecting plate 8 also includes at least one duct delimiting, with wall 9.11, anodic compartments 9 and cathodic compartments 11.

In the represented example the interconnecting plate includes multiple ducts 10 and multiple anodic compartments 9 and cathodic compartments 11. Advantageously, duct 10 and the compartments have hexagonal honeycomb sections, which enables the density of compartments 9, 11 and ducts 10 to be increased.

Figure 1A:
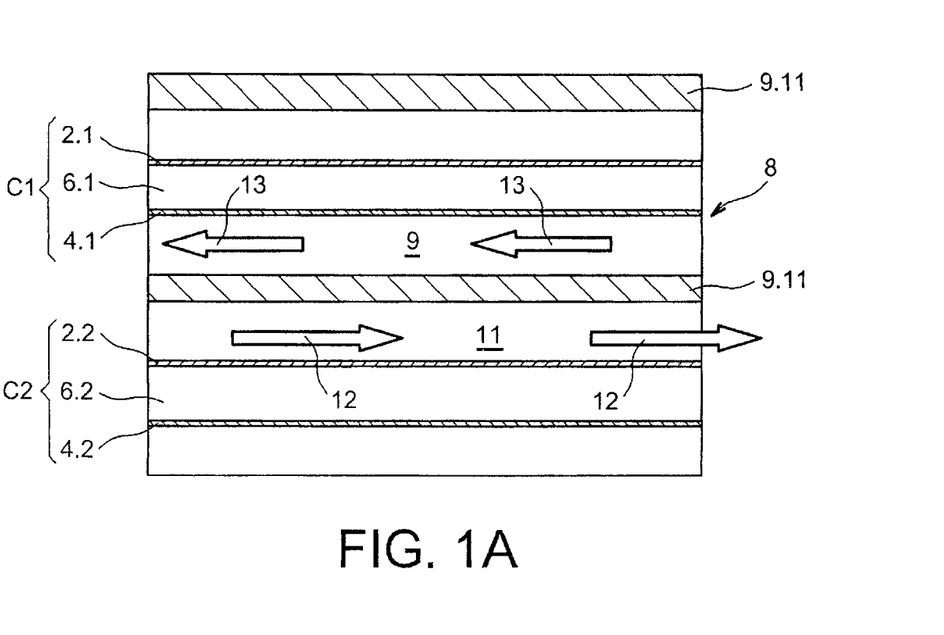
FIG. 1A is a section view of the reactor of FIG. 1 in plane A-A, during normal operation of electrolysis.

As represented in FIG. 1A, non-hydrogenated steam is made to flow at each cathode 2.1, 2.2 and at anode 4.1, 4.2 as a draining gas. This flow both in the anode and in the cathode of non-hydrogenated steam enables the risks of leaks likely to cause impairments of efficiency and/or breakages of all or part of the electrolyser resulting from it to be reduced.

Arrows 12 and 13 of FIG. 1A thus clearly represent the simultaneous path, of equal pressure, of the non-hydrogenated steam in anodic compartments 9 and cathodic compartments 11.

The flow represented symbolically in this case occurs in the reverse direction between an anodic compartment 9 of a cell C1 and a cathodic compartment 11 of an adjacent cell C2 (arrows 12 and 13 in the opposite directions).

Figure 1B:
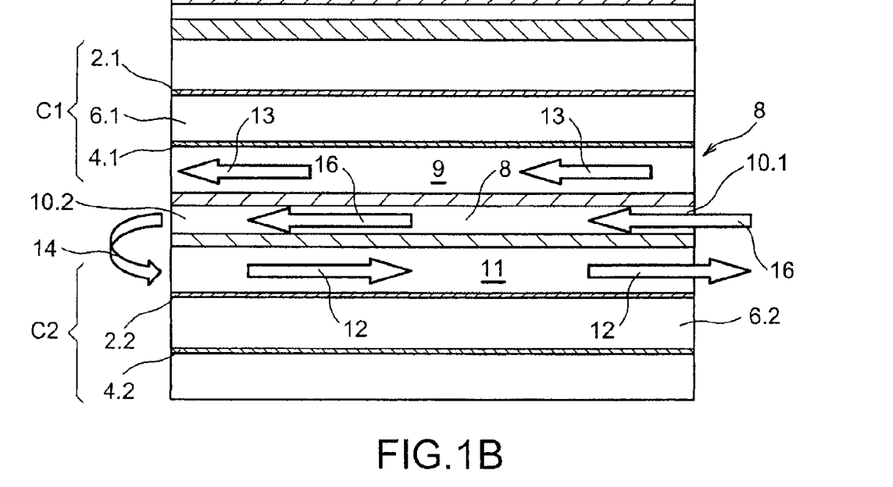
FIG. 1B is a section view of the reactor of FIG. 1 in plane B-B, also during normal operation.

As represented in FIG. 13, the architecture of the electrolyser also enables first end 10.1 of duct 10 to be connected to a supply of non-hydrogenated steam via another duct, and second end 10.2 of duct 10 to be connected to cathodic compartment 11. Arrow 14 thus shows the return flow of the non-hydrogenated steam from its flow in duct 10 (arrows 16) towards cathodic compartment 11.

According to the invention, each cathode inlet end 11.1 is positioned close to oxygen collection duct portion 17 which is made through the stack of cells C1, C2 . . . Cn and of interconnecting plates 8, and each anode inlet end 9.1 is positioned close to hydrogen collection duct portion 18 which is made through the stack of cells C1, C2 . . . Cn and of interconnecting plates 8.

Figure 2:
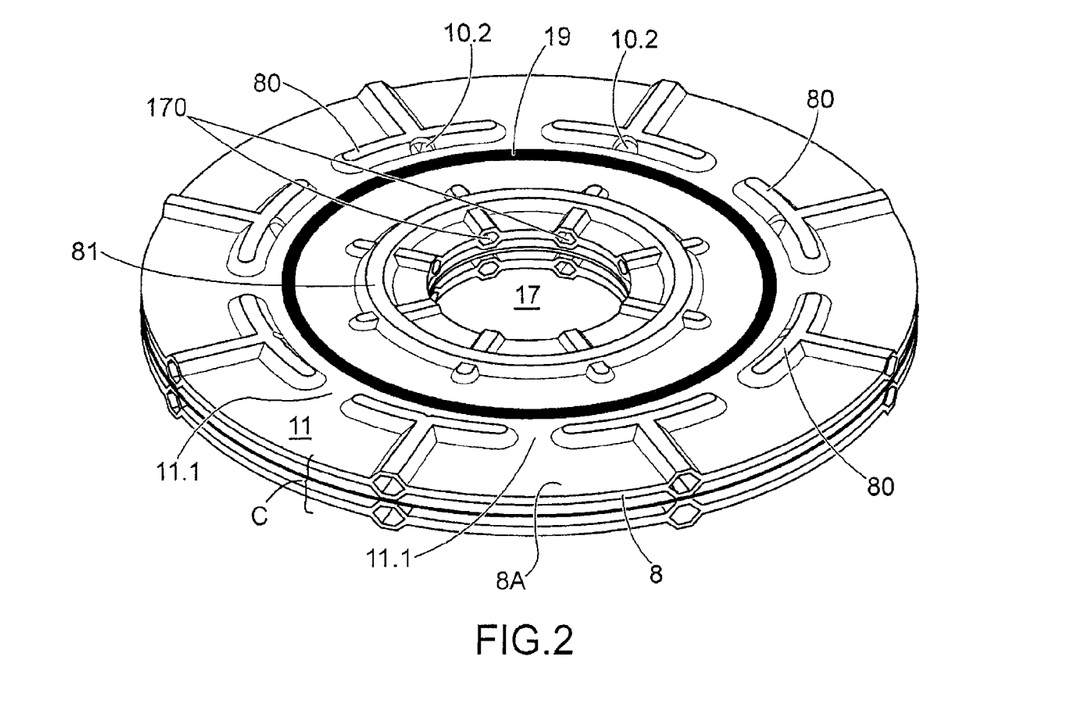
FIG. 2 is a detailed perspective view of the reactor according to FIGS. 1-1B close to a cathode inlet end and a portion of the oxygen collector.
Figure 2A:
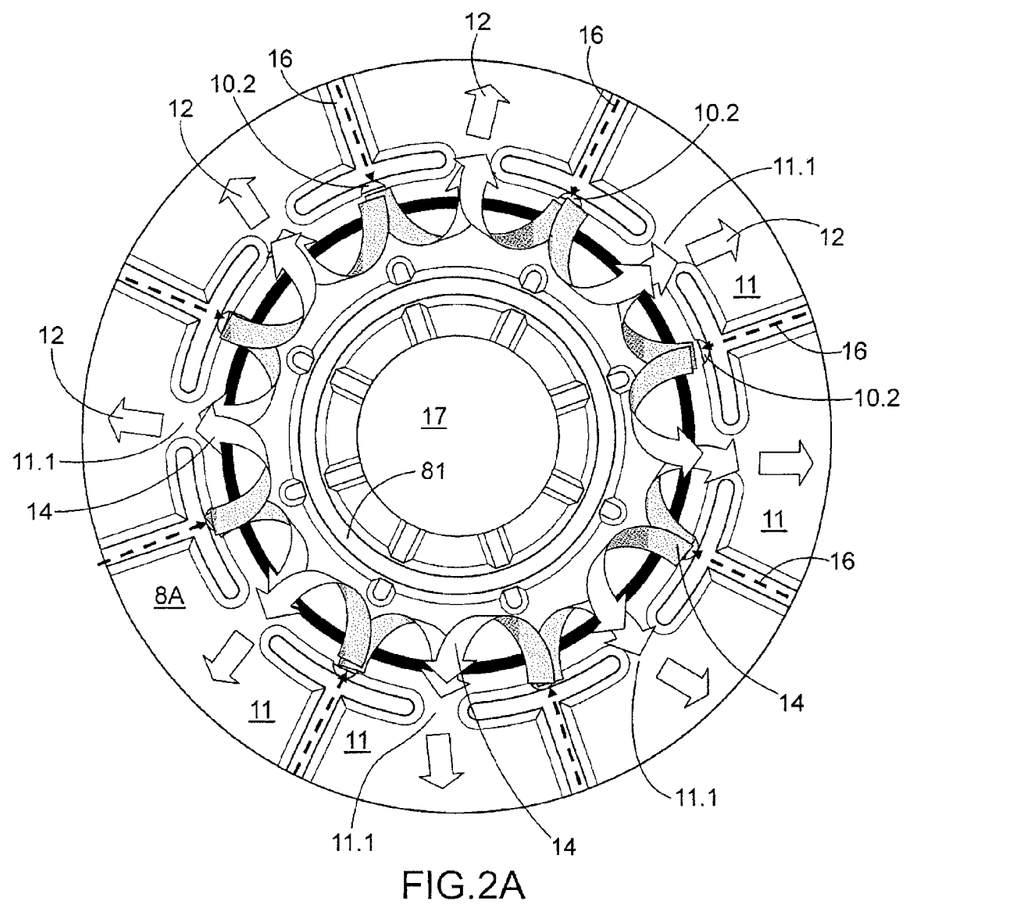
FIG. 2A is the detailed view of FIG. 2, but according to a view of face 8A of the cathodic compartment.

According to the invention, therefore, and as represented in FIGS. 2 to 2A, a face 8A of interconnecting plate 8 includes end 10.2 of each duct 10 emerging in an area between two ribs 80, 81 of interconnecting plate 8.

The space between two adjacent ribs 80 delimits inlet end 11.1 of cathodic compartment 11. Rib 81, for its part, delimits portion 17 of the duct collecting oxygen produced at anode 9. As illustrated, ducts 10 are positioned regularly, their ends 10.2 being separated from one another according to a determined angle, like ends 11.1, which are inserted individually between two ends 10.2 of the ducts.

Figure 2B:
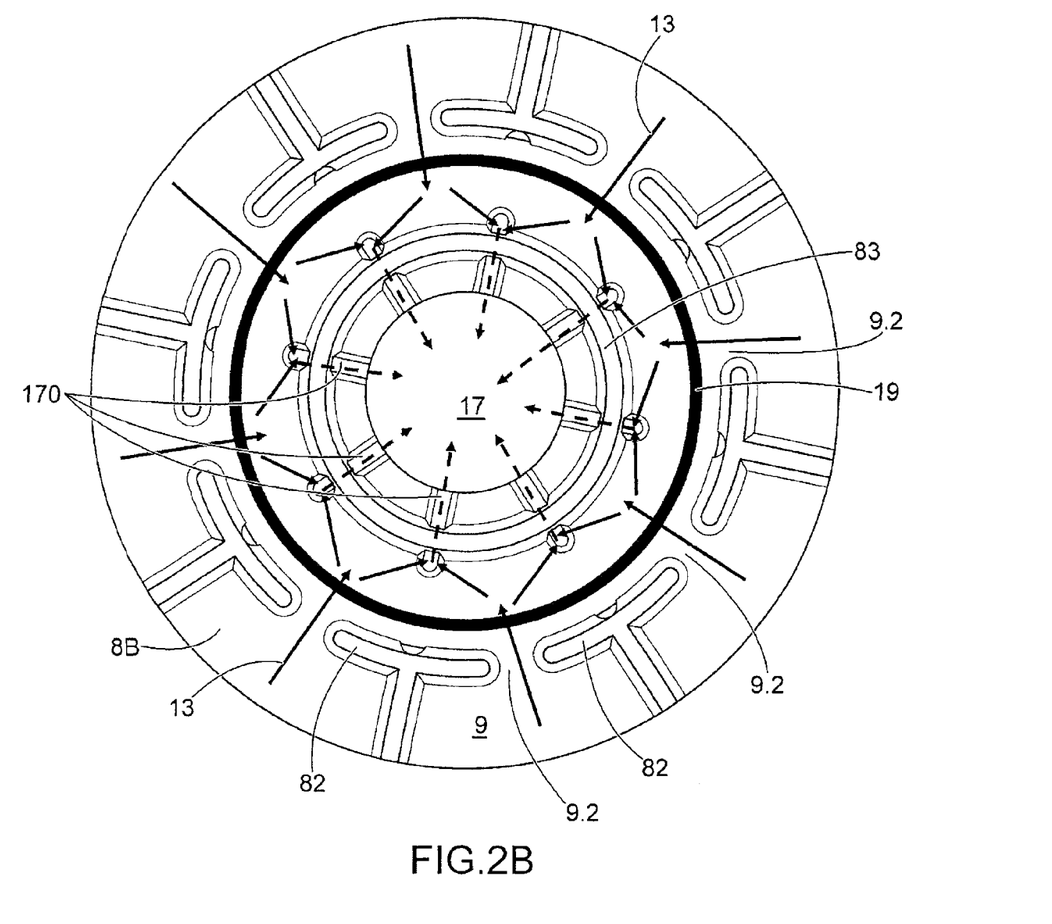
FIG. 2B is the detailed view of FIG. 2, but according to a view of face 8B of the anodic compartment.

As represented in FIG. 2B, other face 8B of interconnecting plate 8, i.e. the one opposite 8A, also contains ribs 82, 83.

The space between two ribs 82 delimits outlet end 9.2 of anodic compartment 9.

Rib 83, for its part, delimits portion 17 of the duct collecting oxygen produced at anode 9.

Figure 3:
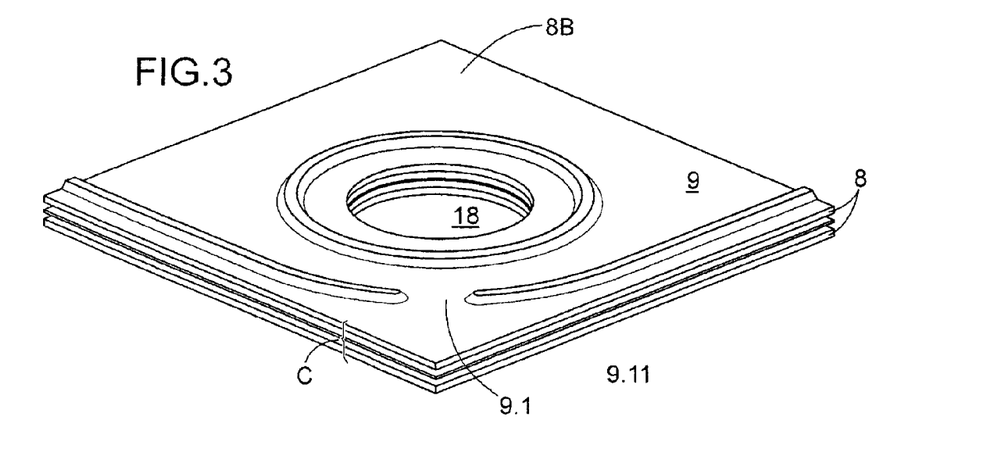
FIG. 3 is a detailed perspective view of the reactor according to FIGS. 1-1B close to an anode inlet end and a portion of the hydrogen collector.
Figure 3A:
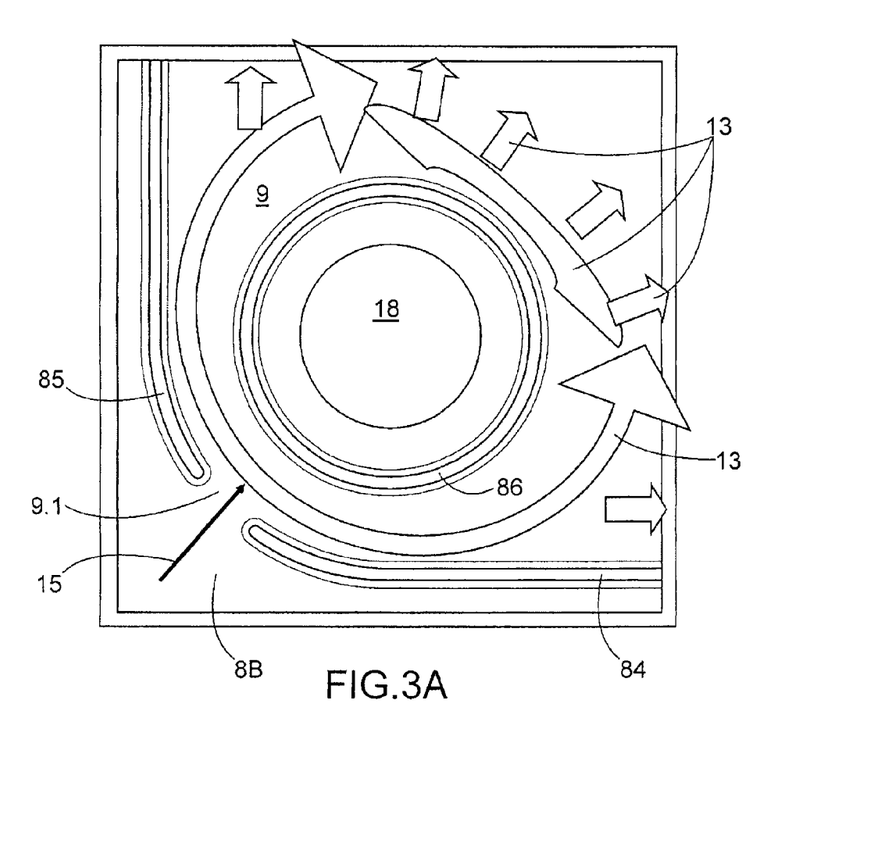
FIG. 3A is the detailed view of FIG. 3, but according to a view of face 8B of the anodic compartment.

Finally, this face 8B includes ducts 170 collecting the oxygen produced at anode 9. As illustrated, ducts 170 are positioned regularly, their ends being separated from one another according to a determined angle, like anode ends 9.2. A duct 170 as illustrated in the form of a tunnel allows improved transmission of the gripping forces of an electrolysis cell C between ribs 81 and 83. Also according to the invention, and as represented in FIGS. 3 and 3A, face 8B of interconnecting plate 8 includes on its periphery an area delimited by two ribs 84, 85. The space between these two ribs 84, 85 delimits inlet end 9.1 of anodic compartment 9. Another rib 86, for its part, delimits the periphery of the portion of duct 18 collecting hydrogen produced at cathode 11.

Figure 3B:
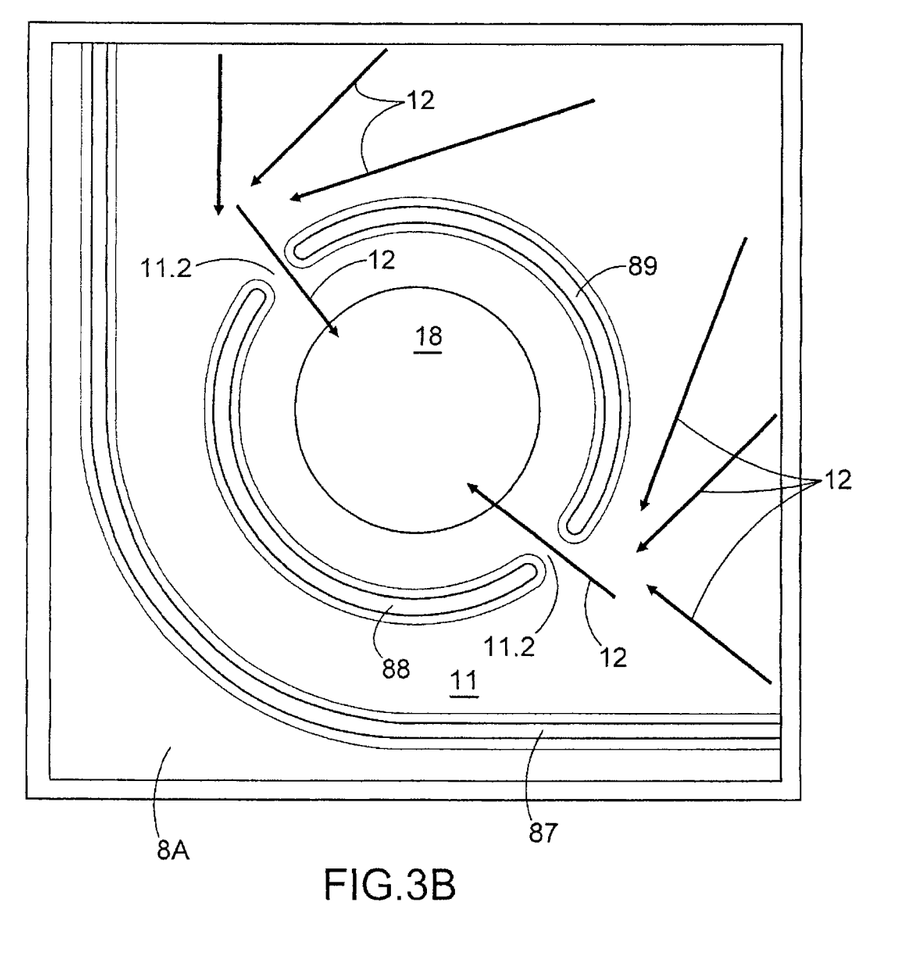
FIG. 3B is the detailed view of FIG. 3, but according to a view of face 8A of the cathodic compartment.

As represented in FIG. 3B, other face 8A of interconnecting plate 8 includes at its periphery a rib 87. Two other ribs 88, 89 delimit output end 11.2 of cathodic compartment 11 and the periphery of portion 18 of the duct collecting hydrogen produced at cathode 11.

In the represented example, interconnecting plates 8 are made by assembling two dished metal plates welded to one another, in particular by means of a welding bead 19 around oxygen collection duct portion 17. Ribs 80, 81, 82, 83, 84, 85, 86, 87, 88 and 89 are thus pressed section ribs.

In the embodiment of FIGS. 3 to 3B there is no welding bead around oxygen collection duct portion 18.

It is here stipulated that the embodiment of an HTE electrolyser of FIGS. 3 to 3B requires the use of a sealed casing able to contain steam containing at most 1% hydrogen, around the stack of electrolysis cells, as described and claimed in application FR 10 51783.

The operation of the electrolyser described above can thus be summarised as follows: the non-hydrogenated steam, which may possibly be preheated, enters into duct 10. When it moves into duct 10 it is heated by heat exchange with cathode 11 and anode 9 lining interconnecting plate 8.

Firstly, this non-hydrogenated steam heated to a temperature close to that of cell C1, enters into cathodic compartment 11 through end 11.1 (arrows 14 of FIGS. 1B and 2A).

More accurately, with reference to FIG. 2A, the stream of non-hydrogenated, heated steam which has not yet undergone any reduction emerges from end 10.2 of duct 10 and enters into cathode end 11.1 by being pushed back, so to speak, on to rib 81. This pushing back of a stream of non-hydrogenated steam which has not yet been reduced creates according to the invention a gas buffer volume around the entire periphery of rib 81, i.e. around the entire periphery of oxygen collection duct 17, as can be seen from the curved, wide arrows represented symbolically in FIG. 2A. This buffer volume is by design at a slightly higher temperature compared to the oxygen collected in duct 17. The function of rib 81 is therefore to allow guidance by discharge of the steam at the outlet of second end 10.2 of duct 10 towards cathode inlet end 11.1 or anode inlet end 9.1. The distance between two adjacent additional ribs 80 positioned opposite rib 81 delimits a cathode inlet end 11.1, thus enabling the speed of the pushed back steam to be increased as it passes through the said end. The performance of the buffer area according to the invention is thereby improved. Indeed, by forcing, so to speak, the pushed back steam with greater speeds in passages 11.1, a phenomenon of retrodiffusion of the produced gases (H2 or O2) is prevented from occurring. In other words, the risk that the produced gases will flow back in an opposite direction from the buffer area towards the collection duct portion is reduced. Or, putting it yet another way, the narrowings of section 11.1 designed in the embodiment of FIGS. 2 to 2B enable the speed of the steam to be increased at the inlet of a cathodic or anodic compartment, in order to prevent the mentioned retrodiffusion. The non-hydrogenated steam having entered cathodic compartment 11 undergoes reduction when it comes into contact with cathodes 2. Hydrogen is then generated according to the following reaction:

$$2H_2O \rightarrow 2H_2 + O_2.$$

The hydrogen generated by reduction along the entire length of cathodic compartments 11 is collected in dedicated collection duct 18. More accurately, as illustrated in FIG. 3B, the produced hydrogen, flowing according to arrows 12, reaches in the peripheral area of face 8A as far as cathode outlet end 11.2 between ribs 88 and 89 and enters into collection duct 18.

Furthermore, simultaneously, non-hydrogenated steam which does not yet contain oxygen enters through the periphery of interconnecting plate 8 into anodic compartment 9 through end 9.1 delimited by ribs 84, 85 (arrow 15 of FIG. 3A). More accurately, this stream of non-hydrogenated steam not containing oxygen is distributed around rib 86, and therefore around the periphery of portion of hydrogen collector 18. This stream of steam creates according to the invention a gas buffer volume around the entire periphery of rib 86, i.e. around the entire periphery of oxygen collection duct 18, as can be seen from the wide arrows represented symbolically in FIG. 3A. This buffer volume is by design at a slightly higher pressure compared to the hydrogen collected in duct 18.

The oxygen produced at anode 9 along the entire length of anodic compartments 9 is collected in dedicated collection duct 17. More accurately, as illustrated in FIG. 2B, the produced oxygen, flowing according to arrows 13, reaches in the area of face 8B as far as anode outlet end 9.2 between adjacent ribs 82 and enters into collection duct 17 via ducts 170.

The invention which has just been described consists simultaneously in:
causing steam to flow concomitantly in the anode and in the cathode,
producing anode and cathode inlet ends which are as close as possible to the collection duct portions respectively of hydrogen and of oxygen, which are produced through the stack and the interconnecting plates, in order to create a buffer volume of steam which is at a slightly higher pressure all around these collection portions. By creating a buffer volume, a leakage flow rate is thus created consisting of non-hydrogenated steam which is not yet reduced and which does not yet contain oxygen. There may be traces derived from the reaction either by mixing (between non-hydrogenated steam and either the collected oxygen or the collected hydrogen), or by diffusion, but given the judicious location of the buffer volume these traces are in all cases highly diluted.

The buffer volume created according to the invention close to the oxygen and hydrogen collector portions by means of injection of steam containing at most 1% hydrogen has the following advantages:
it is of simple manufacture,
there is the possibility of avoiding the use of a seal of complex design, and/or one requiring substantial mechanical clamping which must be controlled,
there is a guarantee of improved safety, if an additional seal is used.

The steam containing at most 1% hydrogen injected from the periphery of the HTE electrolyser, and close to portion of collector 18 (see FIG. 3A) must come from a sealed enclosure in which the said steam is confined, as described and claimed in application FR 10 51783.

Although not described in detail, it is self-evident that one or more layers of materials can be deposited on each of the three constituents (anode, cathode, electrolyte) of a cell, and also on the interconnectors or interconnecting plates.

Other improvements may be made without however going beyond the scope of the invention.

Thus, in the illustrated embodiment, the embodiment shown in FIGS. 2 to 2B illustrates the creation of a buffer volume between inlet 11.1 of cathodic compartment 11 and the periphery of portion 17 of the oxygen collection duct, whereas the embodiment shown in FIGS. 3 to 3B illustrates the creation of a buffer volume between inlet 9.1 of anodic compartment 9 and the periphery of hydrogen collection duct portion 18.

It is also possible to design an HTE electrolyser architecture which is so to speak reversed, i.e. with the embodiment shown in FIGS. 2 to 2B, which would enable the creation of a buffer volume between inlet 9.1 of anodic compartment 11 and the periphery of portion 17 of the hydrogen collection duct, whereas the embodiment shown in FIGS. 3 to 3B would allow the creation of a buffer volume between inlet 11.1 of cathodic compartment 11 and the periphery of oxygen collection duct portion 18. In other words, the collection function of duct portions 17 and 18 is reversed, and the function of compartments 9 and 11 is reversed. This can be achieved, notably, by keeping the same positioning of interconnecting plates 8 within the HTE electrolyser, but by turning around electrolysis cells C1, C2 . . . , Cn, where cathodes 2.1, 2.2, . . . , 2.n are then made to be opposite faces 8B of plates 8, whereas anodes 4.1, 4.2, . . . 4.n are then made to be opposite faces 8A of plates 8.

The choice may also be made to have, within a single HTE electrolyser, two embodiments according to FIGS. 2 to 2B, i.e. for the creation of a buffer volume simultaneously between inlet 11.1 of cathodic compartment 11 and the periphery of oxygen collection duct portion 17, and between inlet 9.1 of anodic compartment 9 and the periphery of hydrogen collection duct portion 18.

The choice may also be made to have, within a single HTE electrolyser, two embodiments according to FIGS. 3 to 3B, i.e. for the creation of a buffer volume simultaneously between inlet 11.1 of cathodic compartment 11 and the periphery of oxygen collection duct portion 17, and between inlet 9.1 of anodic compartment 9 and the periphery of hydrogen collection duct portion 18.

The choice may also be made to have, within a single HTE electrolyser, an embodiment according to FIGS. 2 to 2B and an embodiment according to FIGS. 3 to 3B.

The choice may also be made, within a single HTE electrolyser, to have each cathodic end 11.1 positioned close to hydrogen collection duct portion 18, and to have each anodic end 9.1 positioned close to oxygen collection duct portion 17: the buffer areas according to the invention are then created between the inlet and the outlet of a given produced gas (H2 or O2).

Furthermore, if in the described example the steam at the inlet of the anodic and cathodic compartments is non-hydrogenated, it is self-evident that this steam can also contain gases which do not participate in the actual electrolysis reaction, such as nitrogen and/or CO2, with a view to producing a hydrocarbon.

Finally, although described solely with application to electrolysis of water, it is self-evident that the invention can be applied to other electrocatalysis reactors, provided that the inlet gas(es) can be considered to be neutral and non-harmful with regard to the outlet gases (reaction gases), and provided that the minimal presence of the inlet gas(es) in one of the outlet gases does not hamper its/their collection.

The invention claimed is:

1. A reactor for high-temperature electrolysis of water, comprising:
   a stack of elementary electrolysis cells, each including a cathode, an anode and an electrolyte sandwiched between the cathode and the anode;
   at least one interconnecting plate fitted between two adjacent elementary cells, in electrical contact with an electrode of one of the two elementary cells and an electrode of another of the two elementary cells, wherein the interconnecting plate delimits at least one cathodic compartment and at least one anodic compartment for gas to flow respectively in the cathode and in the anode;
   wherein one end of the cathodic compartments, as a cathode inlet end, is connected to a feed configured to deliver steam, and one end of the anodic compartments, as an anode inlet end, is also connected to a feed configured to deliver steam;
   wherein another end of the cathodic compartments, as a cathode outlet end, emerges in a portion of a hydrogen collection duct which is made through the stack of cells and of the interconnecting plates, and another end of the anodic compartments, as an anode outlet end, emerges in an oxygen collection duct portion which is made through the stack of cells and of the interconnecting plates; and
   wherein each cathode inlet end is positioned close to the oxygen collection and/or hydrogen collection duct portion, and each anode inlet end is positioned close to the hydrogen collection and/or oxygen collection duct portion.

2. A reactor for high-temperature electrolysis of water according to claim 1, further comprising:
   at least one duct where the steam can flow, wherein the duct is formed in the interconnecting plate, wherein a first end of the duct is connected to the feed configured to deliver steam and a second end conveys the steam, emerging in an area close to each cathode or anode inlet end, and to one and/or an other of the oxygen and hydrogen collection duct portions made through the stack of cells and the interconnecting plates, and wherein the area is configured to create a buffer volume of the steam around a periphery of one and/or other of the oxygen and hydrogen collection duct portions before it arrives in the cathode or anode inlet end.

3. A reactor for high-temperature electrolysis of water according to claim 2, further comprising:
   at least one rib positioned around a periphery of one or other of the oxygen and hydrogen collection duct portions, wherein the at least one rib is configured to allow guidance by pushing back the steam at the outlet of the second end of the duct towards the cathode or anode inlet end.

4. A reactor for high-temperature electrolysis of water according to claim 3, further comprising:
   multiple additional ribs positioned opposite the rib around the periphery of one or other of the oxygen and hydrogen collection duct portions, wherein a space between two adjacent additional ribs delimits a cathode or anode inlet end enabling speed of discharge to steam to be increased.

5. A reactor for high-temperature electrolysis of water according to claim 2, wherein each cathode and/or or anode inlet end is positioned on a periphery of the reactor to receive steam around the reactor, and close to one and/or an other of the oxygen and hydrogen collection duct portions made through the stack of cells and of the interconnecting plates, wherein the area defined between the cathode or anode inlet end and one and/or other of the oxygen and hydrogen collection duct portions is configured to create a buffer volume of the steam around a periphery of one and/or other of the oxygen and hydrogen collection duct portions.

6. A reactor for high-temperature electrolysis of water according to claim 5, further comprising:
at least one rib positioned around a periphery of one or other of the oxygen and hydrogen collection duct portions, wherein the at least one rib is configured to allow peripheral guidance of the steam around the collection duct portion.

7. A reactor for high-temperature electrolysis of water according to claim 2, to operate at temperatures of over 450° C., or between 700° C. and 1000° C.

8. A reactor for high-temperature electrolysis of water, comprising:
a stack of elementary electrolysis cells, each including a cathode, an anode and an electrolyte sandwiched between the cathode and the anode;
at least one interconnecting plate fitted between two adjacent elementary cells, in electrical contact with an electrode of one of the two elementary cells and an electrode of another of the two elementary cells, wherein the interconnecting plate delimits at least one cathodic compartment and at least one anodic compartment for gas to flow respectively in the cathode and in the anode;
wherein one end of the cathodic compartments, as a cathode inlet end, is connected to a feed configured to deliver steam, and one end of the anodic compartments, as an anode inlet end, is also connected to a feed configured to deliver steam;
wherein another end of the cathodic compartments, as a cathode outlet end, emerges in a portion of a hydrogen collection duct which is made through the stack of cells and of the interconnecting plates, and another end of the anodic compartments, as an anode outlet end, emerges in an oxygen collection duct portion which is made through the stack of cells and of the interconnecting plates; and
wherein each cathode inlet end is positioned close to the oxygen collection and/or hydrogen collection duct portion, and each anode inlet end is positioned close to the hydrogen collection and/or oxygen collection duct portion;
the reactor further comprising at least one duct where the steam can flow, wherein the duct is formed in the interconnecting plate, wherein a first end of the duct is connected to the feed configured to deliver steam and a second end conveys the steam, emerging in an area close to each cathode or anode inlet end, and to one and/or an other of the oxygen and hydrogen collection duct portions made through the stack of cells and the interconnecting plates, and wherein the area is configured to create a buffer volume of the steam around a periphery of one and/or other of the oxygen and hydrogen collection duct portions before it arrives in the cathode or anode inlet end.

9. A reactor for high-temperature electrolysis of water, comprising:
a stack of elementary electrolysis cells, each including a cathode, an anode and an electrolyte sandwiched between the cathode and the anode;
at least one interconnecting plate fitted between two adjacent elementary cells, in electrical contact with an electrode of one of the two elementary cells and an electrode of another of the two elementary cells, wherein the interconnecting plate delimits at least one cathodic compartment and at least one anodic compartment for gas to flow respectively in the cathode and in the anode;
wherein one end of the cathodic compartments, as a cathode inlet end, is connected to a feed configured to deliver steam, and one end of the anodic compartments, as an anode inlet end, is also connected to a feed configured to deliver steam;
another end of the cathodic compartments, as a cathode outlet end, emerges in a portion of the hydrogen collection duct which is made through the stack of cells and of the interconnecting plates, and another end of the anodic compartments, as an anode outlet end, emerges in an oxygen collection duct portion which is made through the stack of cells and of the interconnecting plates;
wherein each cathode inlet end is positioned close to the oxygen collection and/or hydrogen collection duct portion, and each anode inlet end is positioned close to the hydrogen collection and/or oxygen collection duct portion; and
wherein each cathode and/or anode inlet end is positioned on a periphery of the reactor to receive steam around the reactor, and close to one and/or an other of the oxygen and hydrogen collection duct portions made through the stack of cells and of the interconnecting plates, wherein the area defined between the cathode or anode inlet end and one and/or other of the oxygen and hydrogen collection duct portions is configured to create a buffer volume of the steam around a periphery of one and/or other of the oxygen and hydrogen collection duct portions.

* * * * *